(12) United States Patent
Hasni et al.

(10) Patent No.: US 12,147,935 B2
(45) Date of Patent: Nov. 19, 2024

(54) METHOD FOR PROVIDING APPLICATIONS THAT FACILITATE USER NETWORKS TO ACCOMMODATE LOCALLY-AVAILABLE ITEMS AND SERVICES

(71) Applicant: Cortisoul Innovations, LLC, London, KY (US)

(72) Inventors: Syed Kamran Hasni, London, KY (US); Mary Perkins, London, KY (US)

( * ) Notice: Subject to any disclaimer, the term of this patent is extended or adjusted under 35 U.S.C. 154(b) by 0 days.

(21) Appl. No.: 17/509,210

(22) Filed: Oct. 25, 2021

(65) Prior Publication Data
US 2023/0125399 A1 Apr. 27, 2023

(51) Int. Cl.
*G06Q 30/06* (2023.01)
*G06Q 10/0834* (2023.01)
*G06Q 30/0601* (2023.01)

(52) U.S. Cl.
CPC ... *G06Q 10/08345* (2013.01); *G06Q 30/0611* (2013.01); *G06Q 30/0643* (2013.01)

(58) Field of Classification Search
CPC . G06Q 30/06; G06Q 30/0611; G06Q 30/0643
See application file for complete search history.

(56) References Cited

U.S. PATENT DOCUMENTS

2015/0262121 A1* 9/2015 Riel-Dalpe ............ G06Q 50/12
705/15

FOREIGN PATENT DOCUMENTS

WO WO-2016127917 A1 * 8/2016 ............. G06Q 10/02

OTHER PUBLICATIONS

Zha, L. (2017). Modeling and analysis of on-demand ride-sourcing markets (Order No. 10906736). Available from ProQuest Dissertations and Theses Professional. (2090092342). Retrieved from https://dialog.proquest.com/professional/docview/2090092342?accountid=131444.*

* cited by examiner

*Primary Examiner* — Jeffrey A. Smith
*Assistant Examiner* — Jennifer V Lee
(74) *Attorney, Agent, or Firm* — Cummins IP Law PLLC

(57) ABSTRACT

Implementations set forth herein relate to systems, methods, and apparatuses for operating applications that allow users to indicate their willingness to provide items and/or services to other users and/or a third party. When an item is indicated as available for requesting, and an item is thereafter requested by a requesting user, a server device can cause instances of an item transferring application to provide a corresponding indication to item transferring users within a certain context. Values can be submitted by item transferring users, based on their current context, in furtherance of providing services that facilitate transfer of an item from an item creating user to an item requesting user. Other values can be submitted by the item transferring users in furtherance of characterizing a task of transferring items from a third party entity, who may not be accessing an associated application, to an item requesting user.

9 Claims, 10 Drawing Sheets

METHOD FOR PROVIDING APPLICATIONS THAT FACILITATE USER NETWORKS TO ACCOMMODATE LOCALLY-AVAILABLE ITEMS AND SERVICES

BACKGROUND

Applications assisting with product transit may be limited in their capacity to assist users who may be independently generating products without following a common manufacturing protocol. Such assisting applications may be specific to certain industries and/or products, and therefore may only accommodate users associated with those industries and/or products. For example, an application that is set forth for assisting farmers with tracking their harvest may not have functionality that is particularly useful for restaurants that have an interest in limiting food waste. This issue can be even more apparent for users that work from home to provide certain goods and services. In other words, although many advanced gadgets exist for a user to create certain products in their home—the user may not find a suitable application for determining demand and/or providing their products to others. For example, a user that prepares meals in their home for others may not have a suitable way to measure the demand of their prepared meals and, as a result, may often waste some meals and/or ingredients that are perishable. Moreover, a user that is preparing meals with limited resources may not have time to solicit someone else to deliver a prepared meal to a destination. Should the user task themselves with delivering their products, the user may again experience the wasting of perishable items as they would have less time to prepare and safely store meals and ingredients.

SUMMARY

Implementations set forth herein relate to systems, methods, and apparatuses for providing item creating users with an ability to create interactive interfaces that detail item preparation services offered by the item creating users. Additionally, or alternatively, implementations set forth herein allow item transferring users to offer, based on data generated using the aforementioned interactive interfaces, services for delivering items generated by the item creating users. For a variety of users, this can reduce waste resulting from overproduction of certain items and/or expiration of materials used to create such items. Furthermore, this can allow item requesting users to access local products and/or services without unnecessarily wasting resources.

For example, in some implementations, a system is set forth as including a server computing device that facilitates interactions between users that seek to exchange local services and/or certain items. The system can include multiple instances of different applications that can include, but are not limited to, a creator application, an item requesting application, and an item transferring application. An instance of the creator application can be accessible via a first computing device of an item creating user, who can employ the creator application for creating interfaces that provide details regarding services and/or products offered by the item creating user. An instance of the item requesting application can be accessible via a second computing of a requesting user, who can employ the item requesting application for interacting with certain interfaces created by the item creating user. An instance of the item transferring application can be accessible via a third computing device of an item transferring user, who can employ the item transferring application to offer services for ensuring safe transfer of items between item-creating users and item-requesting users.

In some implementations, an item creating user can access the creator application to generate an interface that identifies items and/or services that the item creating user would like to offer. When accessing the creator application, the item creating user can, for instance, select to add a food item that the item creating user has prepared, or will prepare, by providing natural language content detailing the food item and/or one or more pictures of the food item. The server computing device can determine that the item creating user has provided this information to the creator application and generate corresponding data that can be accessed by instances of the item requesting application. For example, the item creating user can be a chef that operates from their apartment in San Diego, and the item requesting user can be a person living within a 10 mile radius of the item creating user. When the item requesting user accesses their item requesting application, the item requesting user can access the data characterizing one or more items designated by the item creating user (e.g., the chef) as being available for requesting.

When the item requesting user submits a request for an item, the server computing device can generate item transferring data that can be accessed via one or more instances of the item transferring application. For example, the server computing device and/or instances of the item transferring application can determine whether one or more item transferring users are currently located, or are associated with, a location that is within a threshold distance from the item creating user (or a geographic location otherwise associated with the item creating user). Based on this determination, the server computing device and/or one or more instances of the item transferring application can provide an indication to one or more item transferring users that a task of transferring an item is available for the one or more item transferring users to complete. For example, the server computing device can cause an item transferring application of a third computing device to render an indication that solicits a particular item transferring user to submit an input that characterizes a value for completing the task. This solicitation can appear as a selectable graphical user interface (GUI) element at the item transferring application that, when selected, allows an item transferring user to input a value (e.g., a number or other character(s)) into an interface of the item transferring application.

When one or more item transferring users have input their values into their respective instance of the item transferring application, the server computing device can cause these values to be rendered at an interface of the item requesting application. The item requesting user can then select one of the values via a GUI of the item requesting application, and an indication of a selected value can be communicated to the server computing device. Alternatively, or additionally, one or more of the values can be selected by the item requesting application and/or the server computing device automatically, so that the item requesting user does not have to manually accept one of the values. Allowing item transferring users to submit their own particular values can enable item transferring users to more readily utilize their available resources and/or circumstances. For example, an item transferring user that is already driving home from their job that is nearby the item creating user can submit a value that allows them to benefit from their circumstance and previously consumed energy (e.g., energy consumed driving their vehicle to their job). This can reduce wasting of resources that might otherwise be consumed when relying on a limited pool of drivers that may otherwise be directly employed by a restaurant.

In some implementations, the value submitted by an item transferring user can be directly proportional to an earned value that can be utilized to acquire items via an instance of the item requesting application. For example, an item transferring user can set a preference in their item transferring application to be compensated with a token that is managed by the server computing device and/or the item transferring application. Additionally, the item creating user can set a preference in their creator application to be compensated for the creation of certain items with a token that is managed by the server computing device and/or the creator application. In this way, item transferring users can work to earn tokens that can be used to purchase items created by an item creating user and/or services offered by item transferring users. Alternatively, or additionally, the item creating user can earn tokens that can be utilized to pay for services of item transferring users and/or items created by other item creating users.

In some implementations, an item requesting user can access their item requesting application and view items that may not have been made available via an instance of a creator application (i.e., an item creating application). Rather, the item requesting application (i.e., item requesting application) can provide an interface for accessing data from other applications, browsers, websites, and/or other modules that enable persons to request certain items and/or services. For example, the item requesting application can include an application programming interface (API) for interfacing with a particular browser, application, and/or website, to facilitate access to data provided by third party item providers and/or service providers. In some implementations, access to third party data can be provided (with prior permission from the third party) for accessing via the creator application and/or item transferring application (i.e., item transferring application).

When an item requesting user requests a third party item (e.g., an item that was not made available by an item creating user that is employing the item creating application), a third party entity can provide the item requesting user with an order identifier. For example, the order identifier can be provided to the item requesting user via the item requesting application, electronic message, and/or any other modality for receiving information. An item transferring application can receive an indication that the item requesting user has requested the item, and, in response, submit a value for a task of transferring the item from the third party entity to the item requesting user. When the item transferring user is selected to complete this task, the item requesting application can cause an order identifier interface to be rendered at a display interface. The order identifier interface can have a blank field for the item requesting user to submit their order identifier. When the order identifier is submitted, the server computing device can receive the order identifier and cause the order identifier to be accessible and/or rendered via the item transferring application of the selected item transferring user. In this way, when the item transferring user arrives at a geographic location corresponding to the third party entity, the item transferring user can present the order identifier to the third party entity as a way to grant permission for the third party entity to supply the requested item to the item transferring user. The item transferring user can then continue to fulfill the task of delivering the item to the item requesting user. In some implementations, the item transferring application can provide an interface for selecting to open a camera application and capturing an image of a requested item when the item transferring user initially receives the requested item from a third party or an item creating user. The image can then be submitted to the server device via the item transferring application, and the image can be accessed by the requesting user via their item requesting application.

The above description is provided as an overview of some implementations of the present disclosure. Further description of those implementations, and other implementations, are described in more detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
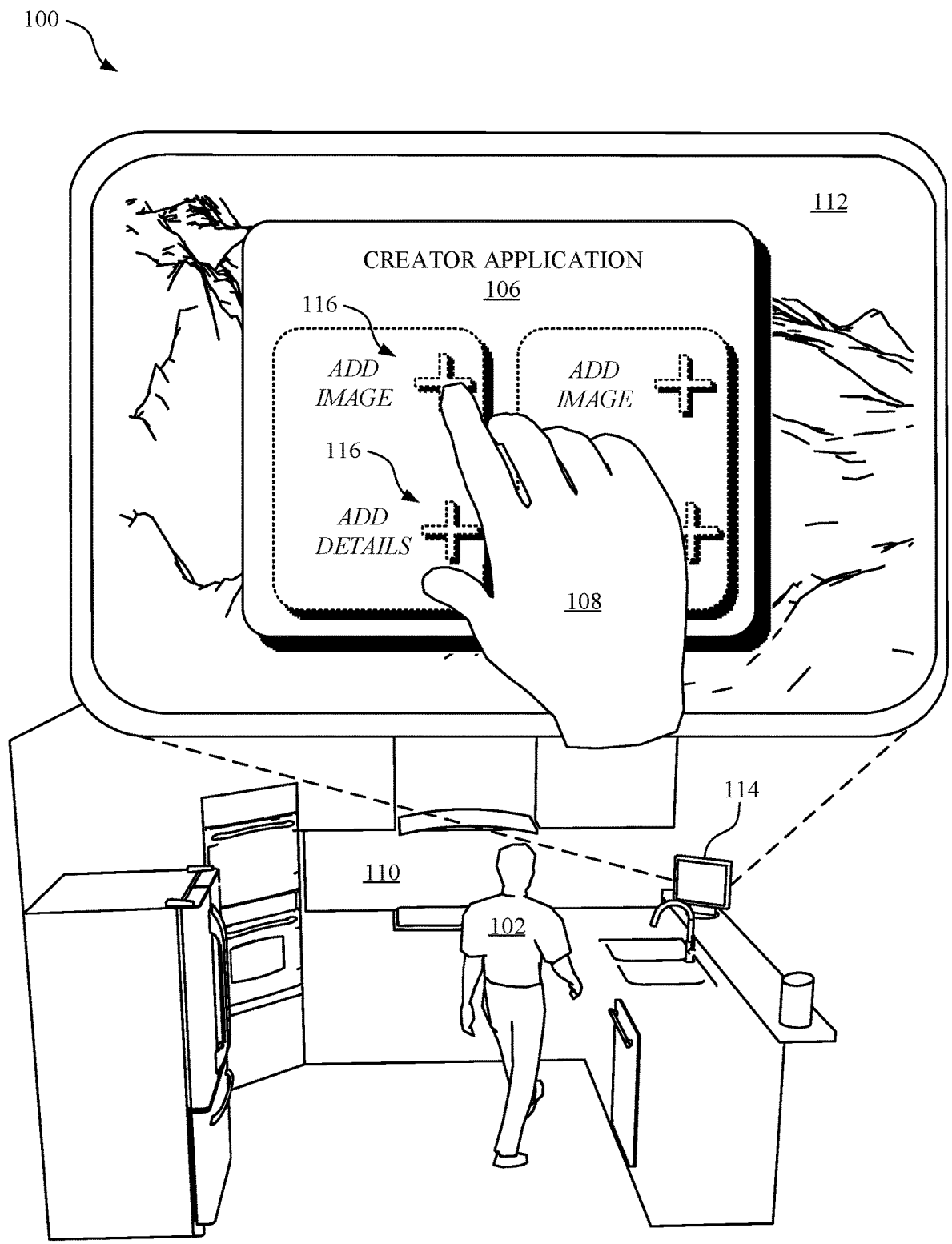
FIG. 1A, FIG. 1B, FIG. 1C, FIG. 1D, FIG. 1E, and FIG. IF illustrate views of various different users interacting with a system for supplying and transferring items.
Figure 1B:
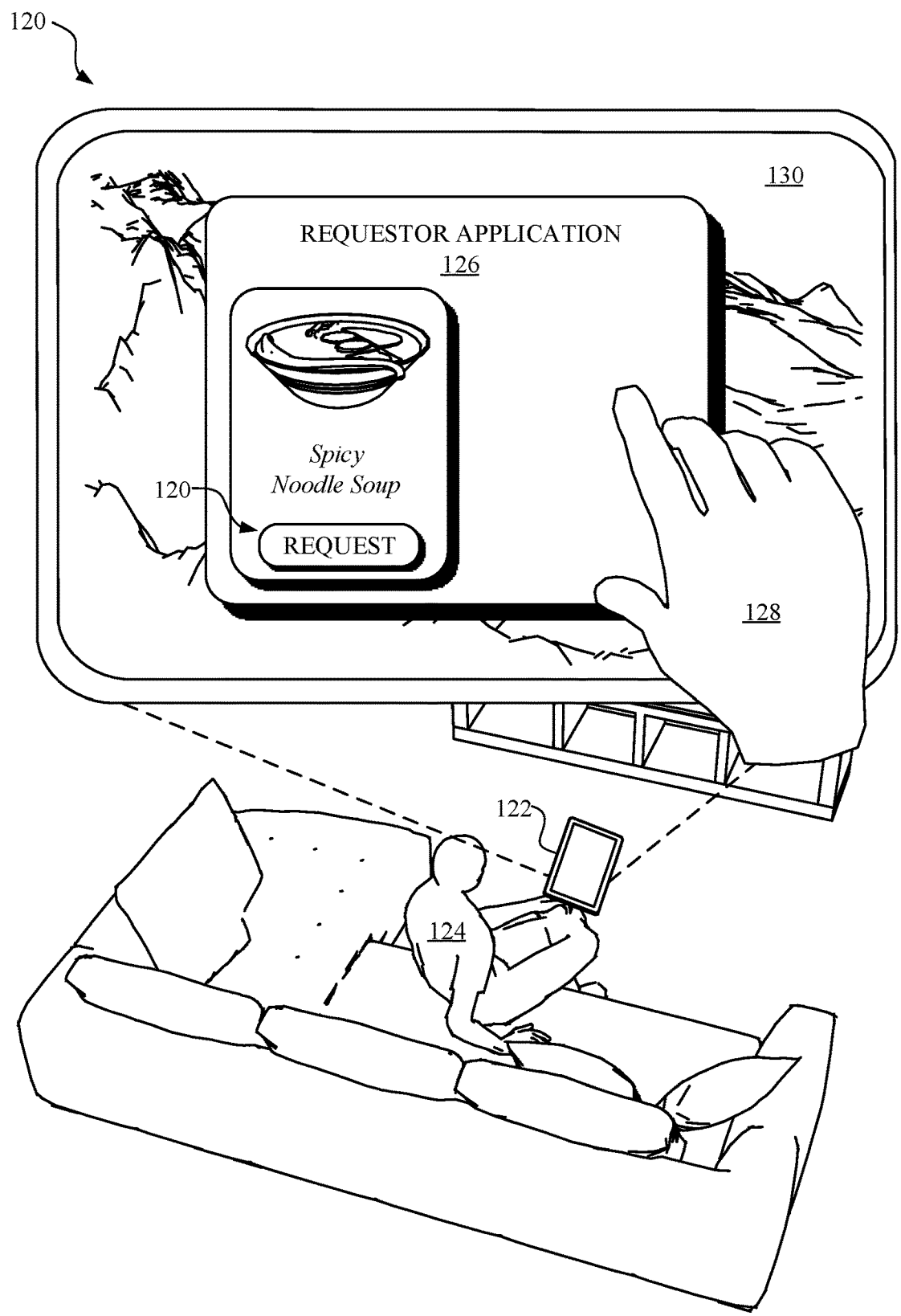

FIG. 1A, FIG. 1B, FIG. 1C, FIG. 1D, FIG. 1E, and FIG. 1F illustrate a view 100, a view 120, a view 140, a view 160, a view 180, and a view 190 of various different users interacting with a system for supplying and transferring items. FIG. 1A includes a view 100 of a user 102 interacting with a computing device 114 in their kitchen 110, while accessing a creator application 106. The creator application 106 can allow the user 102 to arrange a menu of items for other users (e.g., requesting users and/or transferring users) to view for requesting one or more of the items. For instance, when the user 102 accesses the creator application 106, the creator application 106 can render one or more selectable GUI elements 116 at a display interface 112 of the computing device 114. The user 102 can interact with the selectable GUI elements 116 to add, for example, a food item (e.g., spicy noodle soup) to their application page by adding a natural language description of the food item and/or an image of the food item. When the food item is added to the application page by the user 102, another user 124 can access a menu of items via an item requesting application 126, as illustrated in view 120 of FIG. 1B.

When the user 124 is interested in having the user 102 create an item, and having the item transferred to the user 124, the user 124 can access the item requesting application 126 via their computing device 122. When the user 124 opens the item requesting application 126, an interface of the item requesting application 126 can be rendered at a display interface 130, which can allow the user 124 to navigate the item requesting application 126 (e.g., via touch input with a hand 128 of the user 124). For example, the user 124 can navigate to an application page corresponding to a menu of food items that the user 102 has added to their application page via their creator application 106. Each menu item can be rendered with one or more selectable GUI elements 120 that allow the user 124 to request a particular menu item (e.g., the spicy noodle soup) and/or modify particular parameters of the menu item (e.g., ingredients, cooking instructions, etc.).

Figure 1C:
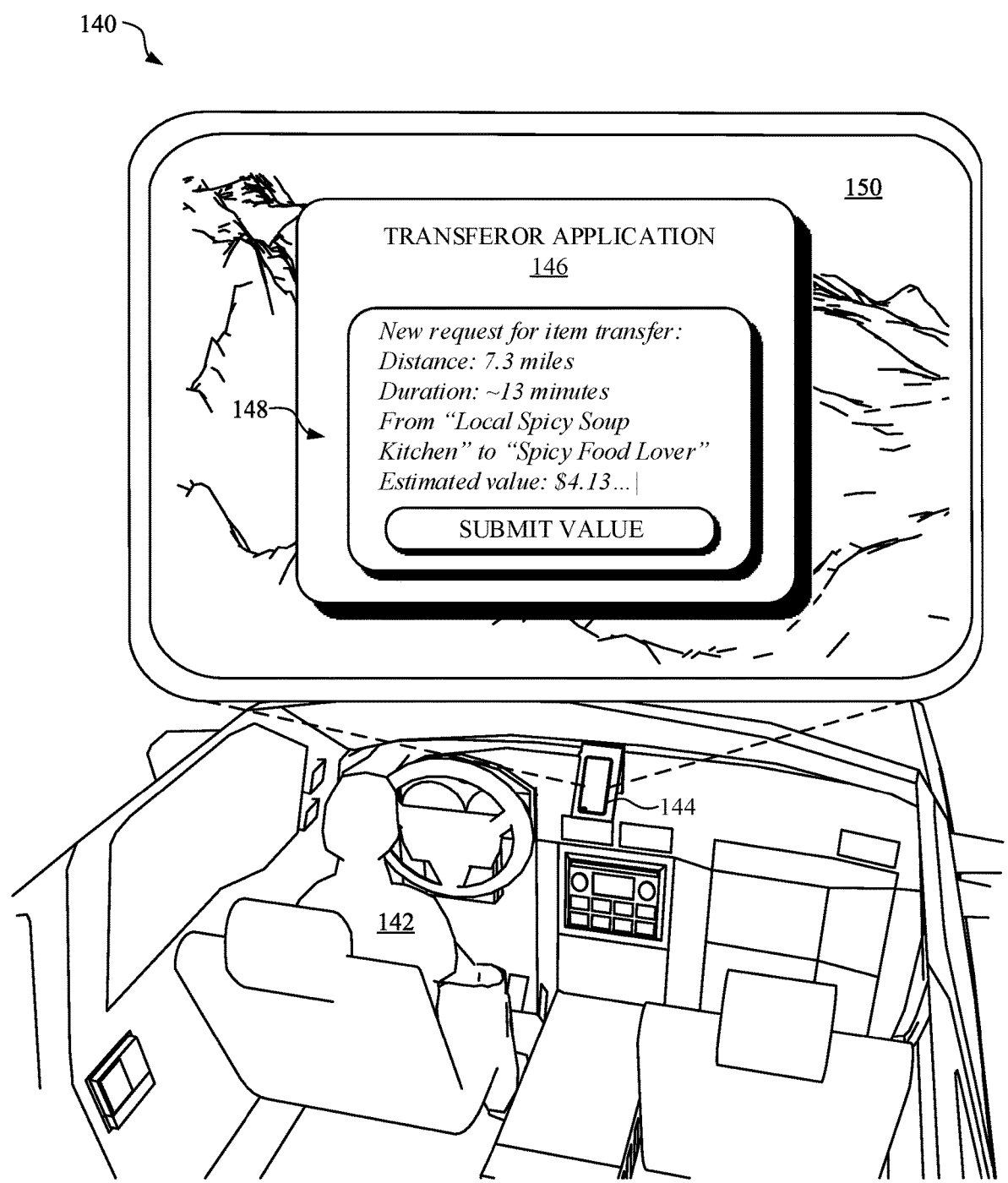
Figure 1D:
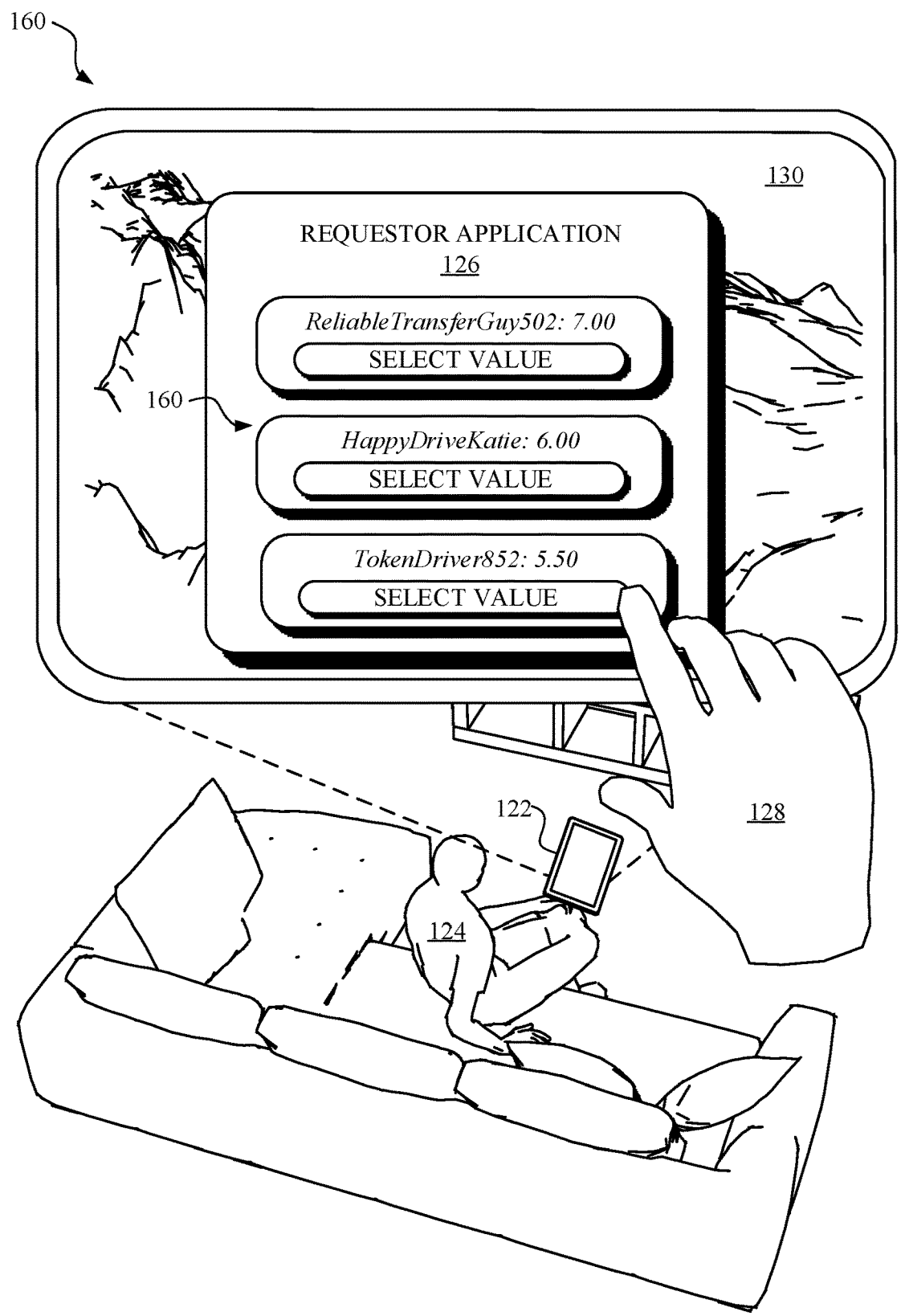
Figure 1E:
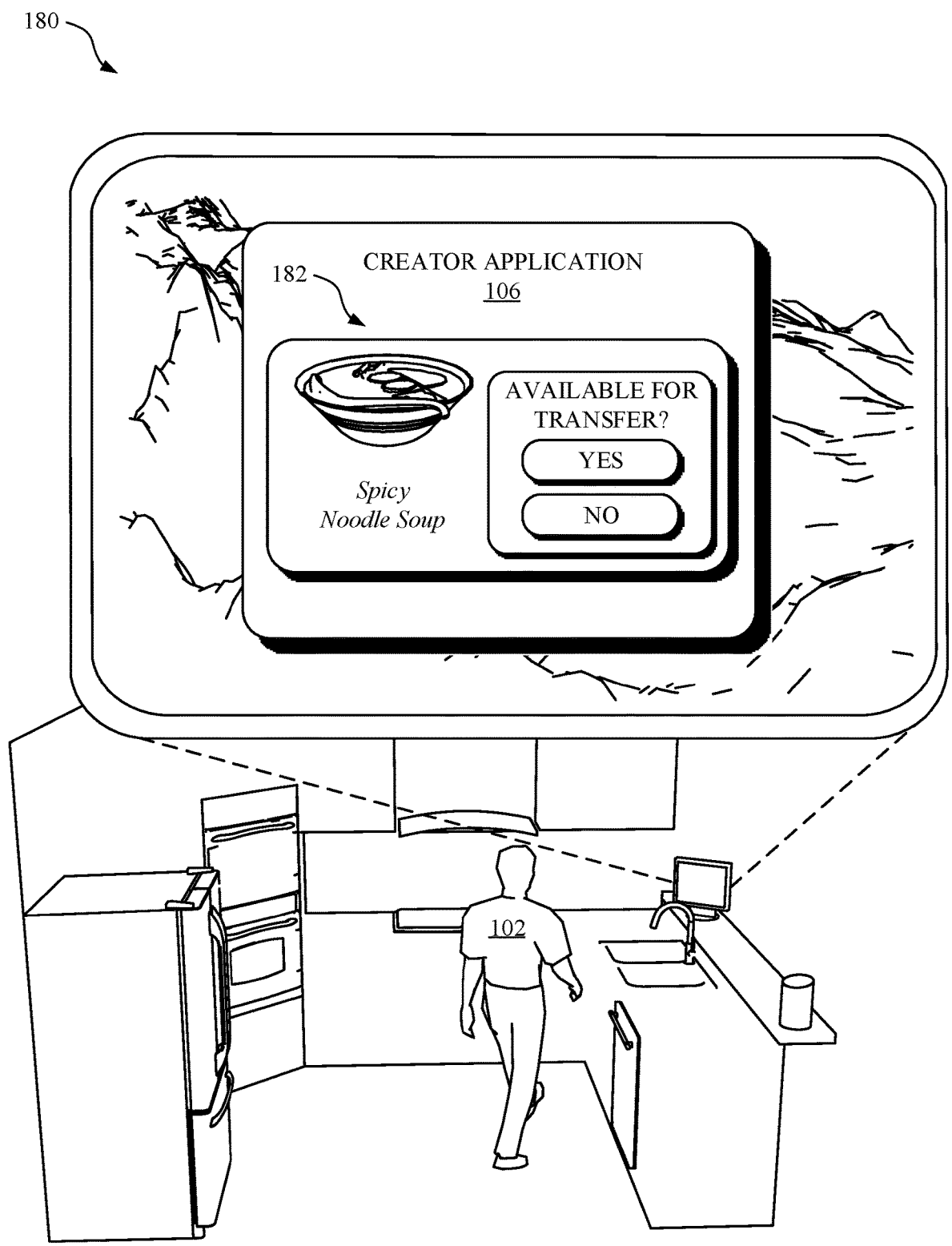
Figure 1F:

When the user 124 chooses to "request" a particular item by tapping on the selectable GUI element 120, the item requesting application 126 can communicate with a server computing device that interfaces with one or more instances of an item transferring application 146, as illustrated in view 140 of FIG. 1C. For example, a user 142 that has elected offer transfer services can receive an indication 148 via their computing device 144 that a new request for transferring an item has been submitted by an item requesting user (e.g., username "Spicy Food Lover"). The indication 148 can be a selectable GUI element rendered at a display interface 150 of the computing device 144. In some implementations, the indication 148 can include details such as: distance between the item and the item requesting user (e.g., 7.3 miles), an estimated amount of time that the transfer will take (e.g., "Duration of 13 minutes"), an identifier for the item creating user (e.g., Local Spicy Soup Kitchen"), an identifier for the item requesting user (e.g., "Spicy Food Lover"), an estimated value for the task of transferring the item (e.g., 4.13), and/or an interface for allowing the user 142 to submit a custom value (e.g., 5.50).

When the submits a value via the indication 148 (e.g., by tapping "submit value"), the item transferring application 146 can communicate with the server computing device to cause the item requesting application 126 to indicate the value submitted by the user 142. Alternatively, or additionally, the server computing device can cause the item requesting application 126 to identify other values submitted by other item transferring users, thereby allowing the user 124 to select a value that is most desirable. For example, the item requesting application 126 can render multiple different selectable GUI elements, and each selectable GUI element can correspond to a particular value submitted by a particular item transferring user. For instance, the submitted values can include: 7.00, 6.00, and 5.50. The user 124 can select a value (e.g., 5.50) by tapping the display interface 130 with their hand 128 at a location of the selectable GUI element 160 corresponding to the desired value (e.g., 5.50). In response to the user 124 selecting the selectable GUI element 160, the server computing device can cause the creator application 106 to render a selectable GUI element 182, as illustrated in view 180 of FIG. 1E.

For example, the selectable GUI element 182 can include a description of the item to be transferred by the item transferring user 142 who provided the value that was selected by the item requesting user 124. The item creating user 102 can delay selecting the selectable GUI element 182 until the item has been fully prepared and/or is otherwise ready to be picked up by the item transferring user 142. When the item creating user 102 determines that the item is ready for transfer, the user 102 can interact with the creator application 106 (e.g., select "YES") to cause the item transferring application 146 to indicate that the item is ready for transferring. For instance, and as illustrated in view 190 of FIG. 1F, the server computing device can cause the item transferring application 146 to render a selectable element 192 and details regarding the task of transferring the item. The details can include a starting address where the item is located and the finishing address can include a location associated with the item requesting user 124. Alternatively, or additionally, the server computing device can cause the item transferring application 146 to provide a selectable GUI element 192 that, when selected, causes route instructions to be rendered via the computing device 144. For instance, in response to selecting the selectable GUI element 192, the item transferring application 146 and/or another application (e.g., a map application) can provide audible instructions for navigating from a current location of the user 142 to a location of the item to be transferred. Additionally, when the user 142 arrives at the item location, the item transferring application 146 and/or the other application can provide audible instructions for navigating from the item location to a location of the item requesting user 124.

Figure 2:
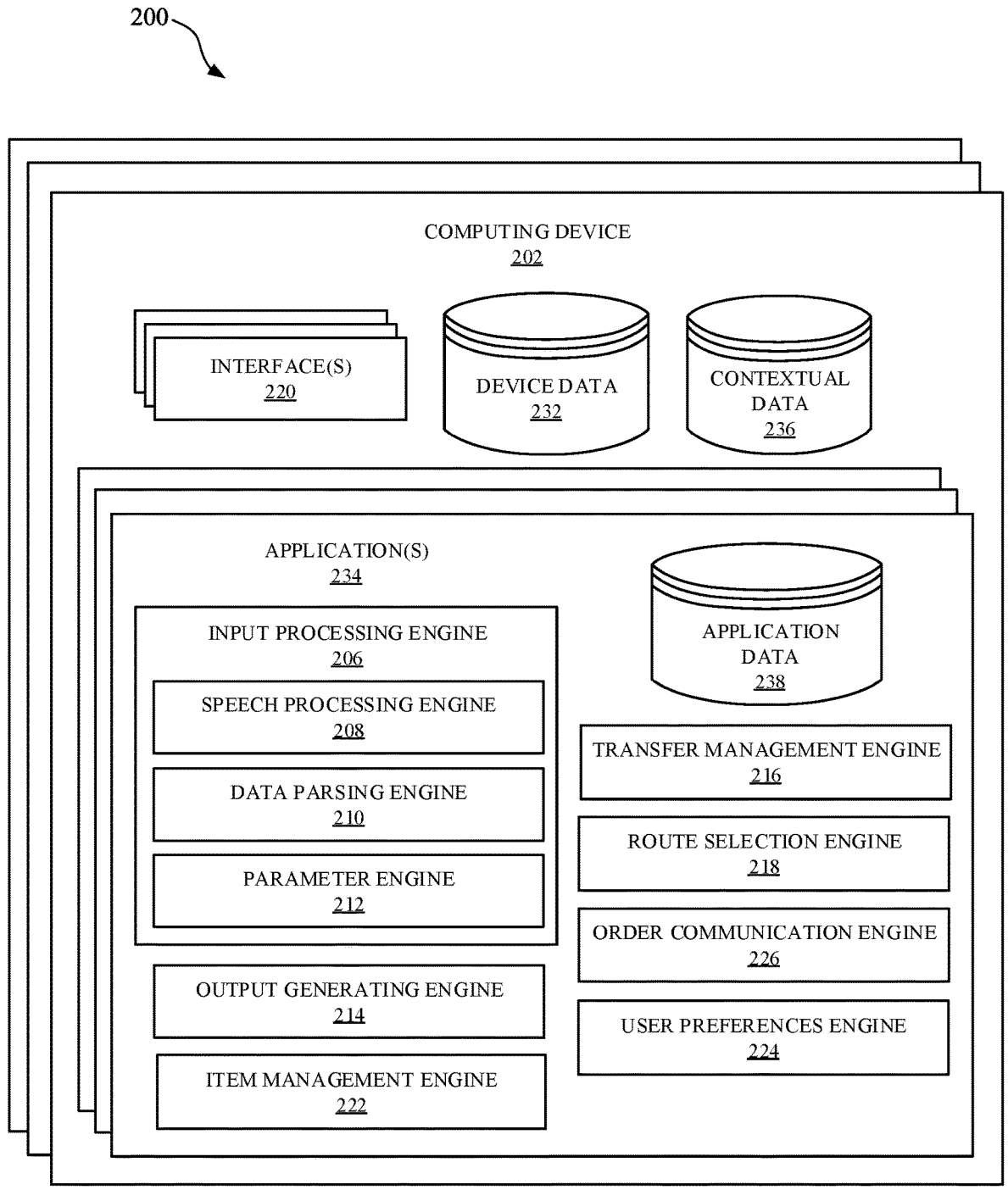
FIG. 2 illustrates a system that can communicate with a variety of different applications that allow users to arrange menus and offer services for transferring items between an item creating user and an item requesting user.

FIG. 2 illustrates a system 200 that can communicate with a variety of different applications 234 that allow users to create item menus, and submit selectable values for tasks of transferring the items between an item creating user and an item requesting user. A user can interact with the applications 234 via interface(s) 220, which can be a microphone, a camera, a touch screen, keyboard, display, a user interface, and/or any other apparatus capable of providing an interface between a user and an application. For instance, a user can initialize an application 234 by providing a verbal, textual, touch, gesture, and/or a graphical input to an interface 220 to cause the application 234 to initialize one or more actions (e.g., provide data, communicate with a server computing device, control a peripheral device, access an agent, communicate with a person, generate an input and/or an output, etc.).

Each computing device 202 can include a display device, which can be a display panel that includes a touch interface for receiving touch inputs and/or gestures for allowing a user to control applications 234 of the computing device 202 via the touch interface. In some implementations, the computing devices 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network, or a wide area network. The computing device 202 can offload computational tasks to the server device to conserve computational resources at the computing device 202. For instance, the server device can host the applications 234, and/or computing device 202 can transmit inputs received at one or more interfaces 220 to the server device. However, in some implementations, the applications 234 can be hosted at the computing devices 202, and various processes that can be associated with application operations can be performed at the computing devices 202. In some implementations, the applications 234 for a particular computing device 202 can include one or more of an application selected from an item creating application, an item transferring application, an item requesting application, and/or any other application discussed herein.

In various implementations, all or less than all aspects of the applications 234 can be implemented on the computing device 202. In some of those implementations, aspects of the applications 234 are implemented via the computing device 202 and can interface with a server device, which can implement other aspects of the applications 234. The server device can optionally serve a plurality of users and their applications via multiple threads. In implementations where all or less than all aspects of the applications 234 are implemented via one or more computing devices 202, the applications 234 can be separate from an operating system of the computing device 202 (e.g., installed "on top" of the operating system)—or can alternatively be implemented directly by the operating system of the computing device 202 (e.g., considered an application of, but integral with, the operating system).

In some implementations, the applications 234 can include an input processing engine 206, which can employ multiple different modules for processing inputs and/or outputs for the computing device 202 and/or a server device. For instance, the input processing engine 206 can include a speech processing engine 208, which can process audio data received at an interface 220 to identify the text embodied in the audio data. The audio data can be transmitted from, for example, the computing device 202 to the server device to preserve computational resources at the computing device 202. Additionally, or alternatively, the audio data can be exclusively processed at the computing device 202. In some implementations, a user can provide spoken inputs for interacting with an application 234 of the computing device 202.

The process for converting the input data to text can include a speech recognition algorithm, which can employ neural networks, and/or statistical models for identifying groups of data corresponding to words or phrases. The text converted from the input data can be parsed by a data parsing engine 210 and made available to the applications 234 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the applications 234 and/or an application or agent that is capable of being accessed via the applications 234. For example, application data 238 can be stored at the server device and/or the computing device 202, and can include data that defines one or more actions capable of being performed by the applications 234, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an interface 220 for providing an output to a user, and/or communicate with one or more other applications 234 or devices.

In some implementations, an application 234 can be an application that can be installed "on-top of" an operating system of the computing device 202 and/or can itself form part of (or the entirety of) the operating system of the computing device 202. The application(s) 234 includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in audio data. Also, for example, on-device natural language understanding (NLU) can be performed using an on-device NLU module that processes recognized text, generated using the on-device speech recognition, and optionally contextual data, to generate NLU data.

In some implementations, the computing device 202 can include one or more applications 234 which can be provided by a third-party entity that is different from an entity that provided the computing device 202 and/or the other applications 234. An application state engine of the applications 234 and/or the computing device 202 can access application data 238 to determine one or more actions capable of being performed by one or more applications 234 and/or a state of a respective device that is associated with the computing device 202. A device state engine of the applications 234 and/or the computing device 202 can access device data 232 to determine one or more actions (e.g., requesting an item, submitting a value, etc.) capable of being performed by the computing device 202 and/or one or more devices that are associated with the computing device 202. Furthermore, the application data 238 and/or any other data (e.g., device data 232) can be accessed by the applications 234 to generate contextual data 236, which can characterize a context in which a particular application 234 and/or device is executing, and/or a context in which a particular user is accessing the computing device 202, accessing an application 234, and/or any other device or module. For example, an application 234 can determine, with prior permission from a user, a geographic location of the computing device 202, the user, and/or any other item associated with the user, for fulfilling certain operations.

While one or more applications 234 are executing at the computing device 202, the device data 232 can characterize a current operating state of each application 234 executing at the computing device 202. Furthermore, the application data 238 can characterize one or more features of an executing application 234, such as content of one or more graphical user interfaces being rendered at the direction of one or more applications 234. Alternatively, or additionally, the application data 238 can characterize an action schema, which can be updated by a respective application 234 based on a current operating status of the respective application. Alternatively, or additionally, one or more action schemas for one or more applications 234 can remain static, but can be accessed by the application state engine to determine a suitable action to initialize via an applications 234.

In some implementations, the system 200 can include an item management engine 222 that can facilitate, via an item creating application, arrangement of interfaces for presenting information related to items that can be requested. Alternatively, or additionally, the item management engine 222 can facilitate requesting of one or more items that are indicated as available via an interface of an item requesting application. For example, the item management engine 222 can receive inputs from a user via interfaces 220 for directing an application to upload text, images, and/or other data that can be accessed by a server computing device. The item management engine can generate arrangement data that can indicate an arrangement for the images and/or text at various interfaces of an item requesting application. Alternatively, or additionally, the item management engine 222 can receive inputs that indicate a user is requesting that a particular item be transferred to their location. In response, the item management engine 222 can communicate with the server computing device to cause a corresponding creator application to indicate that the particular item has been requested, and/or cause instances of an item transferring application to indicate that the particular item is to be transferred.

In some implementations, the system 200 can include a transfer management engine 216 that can process data associated with requested items, items that are being transferred, and/or items that have previously been transferred. For example, the item management engine 216 can determine that a particular item has been requested and communicate details about the request to the transfer management engine 216. Data received by the transfer management engine 216 can be processed to determine a first geographic location for the item and/or item creating user, a second geographic location for the requesting user, a value selected for the task of transferring the item, and whether a first type of item transferring users are available within a threshold distance from either geographic location.

In some implementations, the transfer management engine 216 can determine an amount of process time specified by the item creating user for generating the requested item. The process time can be utilized by the transfer management engine 216 for identifying item transferring users that may be available for transferring the requested item (e.g., walking the item, driving the item, flying the item, etc.) from the first geographic location to the second geographic location. For example, a distance threshold for identifying item transferring users that can be available to transfer the item can be based on the process time. In some implementations, the transfer management engine 216 can consider the distance threshold to be directly proportional to the process time. Alternatively, or additionally, when the process time is above a certain process time threshold, the transfer management engine 216 can set the distance threshold above a certain distance threshold. Alternatively, or additionally, when the process time is equal to or below the certain process time threshold, the transfer management engine 216 can set the distance threshold equal to or below the certain distance threshold. In this way, a pool of available item transferring users can be selected according to a dynamic distance threshold, which can be based at least on a process time set by the item creating user and/or automatically set by the server device.

In some implementations, the system 200 can include a route selection engine 218 that can process data provided by the transfer management engine 216 for generating one or more routes for transferring an item. The one or more routes can be characterized by route data that can be available to the creator application, requesting application, the item transferring application, and/or a third party entity. In some implementations, when an item transferring user is selected to transfer an item, the route selection engine 218 can select a suitable route for the item transferring user to navigate from a current location of the item transferring user, to a first geographic location associated with the item creating user, to a second geographic location associated with the item requesting user, and/or optionally to a geographic location (e.g., a home of the item transferring user, a location for another item to be picked up from and/or transferred to, etc.) associated with the item transferring user.

In some implementations, the order communication engine 226 can provide a status of an item request to each user associated with the item request, and/or facilitate communications between each user associated with the item request. For example, the order communication engine 226 can provide an indication to an item creating user when the item creating user has arrived within a threshold vicinity of the item creating user and/or requested item. Alternatively, or additionally, the order communication engine 226 can cause the item transferring application to render an interface for capturing an image of the requested item when the requested item is pickup up by the item transferring user from the item creating user. Alternatively, or additionally, the order communication engine 226 can provide one or more administrative interfaces for users to view historical data associated with requests for certain items, item transfers, item creating user reviews, item transferring user reviews, requesting user reviews, tokens earned, tokens paid out, and/or any other information that can be communicated via an application.

In some implementations, the system 200 can include a user preference engine 224 that can manage preferences of users of the system 200. For example, an item transferring user can interact with an instance of the item transferring application to communicate, to the user preference engine 224, that the item transferring user would prefer to be designated as a first type of item transferring user or a second type of item transferring user. In some implementations, the first type of item transferring user can be an item transferring user that can submit values for various tasks of transferring items when the item transferring user is determined to be within a threshold distance from the item. In some implementations, the second type of item transferring user can be an item transferring user that is employed, by the system 200, to complete a particular transfer task when none of the first type of item transferring users are available and/or have submitted a value for the particular transfer task. In this way, the second type of item transferring users can be considered default item transferring users in some instances, and/or can earn a higher token rate for their various acts of transferring.

Figure 3A:
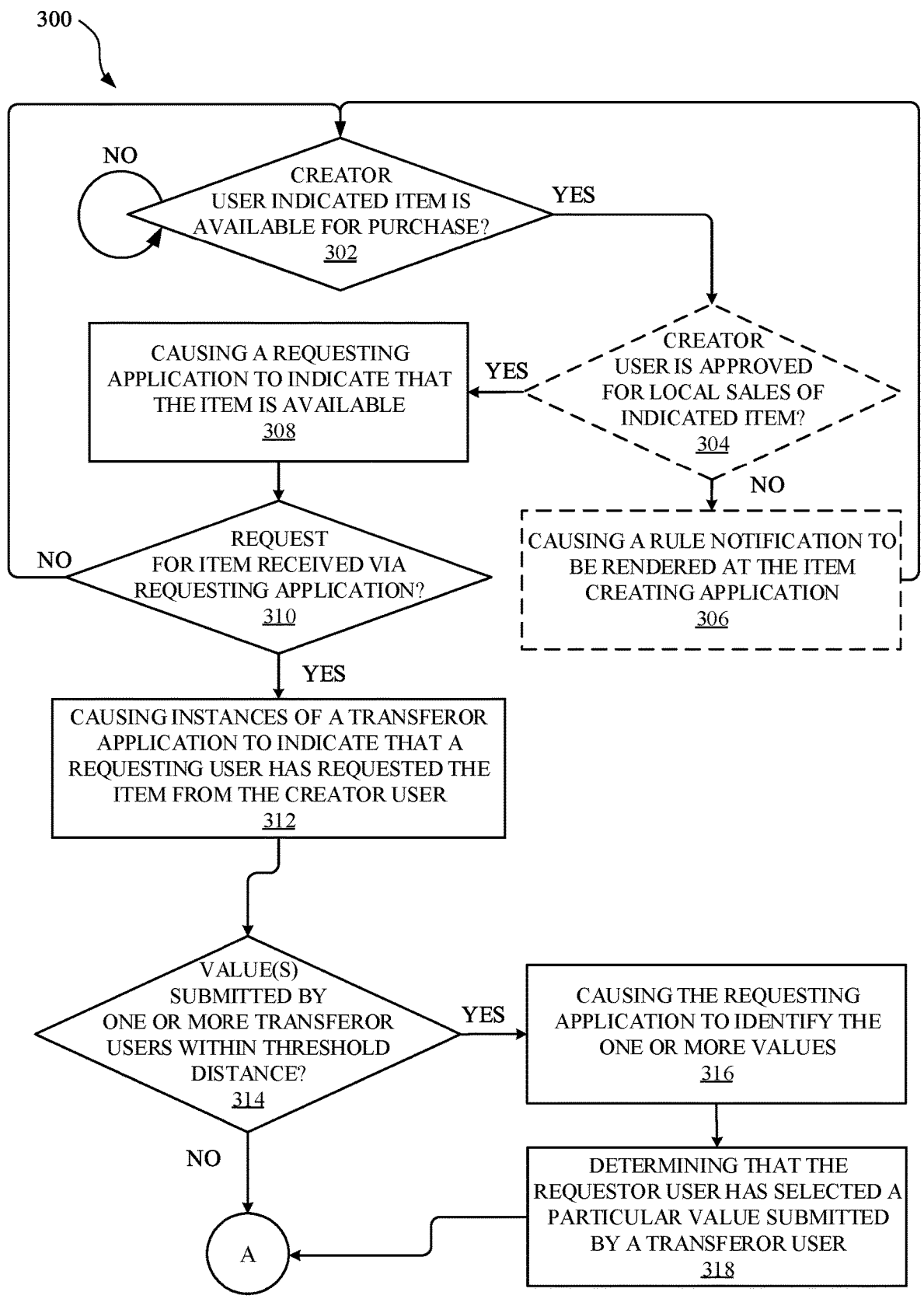
FIG. 3A and FIG. 3B illustrate methods for operating a system that allows users to offer items and services within a geographic area through different applications, and earn customizable benefits for providing such items and/or services.
Figure 3B:
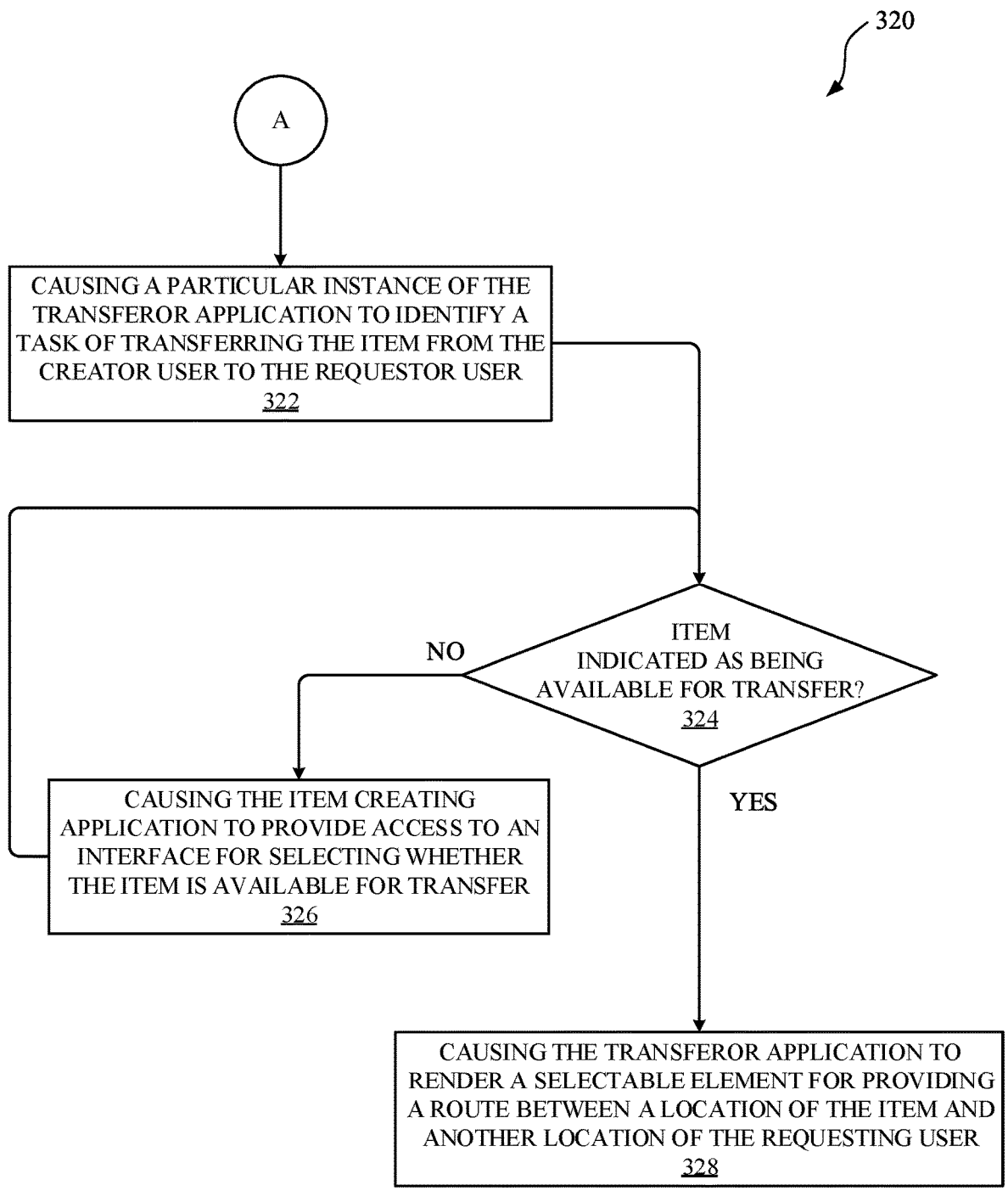

FIG. 3A and FIG. 3B illustrate a method 300 and a method 320 for operating a system, application(s), and/or device(s) that allows users to offer items and services within a geographic area through different applications, and earn customizable benefits for providing such items and/or services. The method 300 and the method 320 can be performed by one or more devices, applications, and/or any other apparatus or module capable of providing one or more interfaces to a user. Each operation of the method 300 and the method 320 can be separated into an individual process, and/or combined to form other processes that may not correspond to the method 300 and the method 320. Various implementations and/or variations for each operation are discussed throughout the specification. The method 300 can include an operation 302 of determining whether an item creating user has indicated that an item is available for requesting. The item creating user can indicate that an item is available for requesting by interacting with an item creating application of a first computing device (e.g., a tablet computing device). For instance, an interface of the item creating application can provide selectable elements for creating a menu that can be accessible via an item requesting application. Therefore, when the item creating user adds an item via the item creating application, the item can be requested via a menu that is rendered at the item requesting application.

When the item creating user uses the creator application to indicate that the item is available for requesting, the method 300 can proceed from the operation 302 to an optional operation 304. Otherwise, the operation 302 may be performed until an item creating user indicates that an item is available for requesting. The optional operation 304 can include determining whether the creator user is approved for local sales of the indicated item. For example, the item creating application can determine, with prior permission from the item creating user, a location of the item creating user and/or a location of an item that is to be provided by the item creating user. Based on this location, the item creating application and/or other application can determine one or more local rules that can limit an ability of a person in the location to provide a particular service and/or item. Based on these identified rules, the item creating application can provide an interface for uploading data (e.g., a document, recording, image, etc.) that can indicate proof that the local rules have been satisfied by the item creating user. In some implementations, a heuristic process and/or one or more trained machine learning models can be utilized to process uploaded data for determining whether the item creating user has satisfied the local rules. When the item creating user is determined to have satisfied the local rules for the particular item, the method 300 can proceed to an operation 308. Otherwise, when the creator user has not be approved for local sale of the indicated item, the method 300 can proceed from the operation 304 to an operation 306.

The operation 306 can include causing a rule notification to be rendered at the item creating application. The rule notification can identify one or more rules that have been identified based on a location of the user and/or the indicated item, and that have not been satisfied. In some implementations, the rule notification can include content that is generated using one or more heuristic processes and/or one or more trained machine learning models. For instance, a trained machine learning model, such as a transformer neural network, can be utilized to generate text that can kindly express why the indicated item cannot be sold in the locality of the item creating user. The method 300 can proceed from the operation 306 back to the operation 302 for determining whether the item creating user has indicated that another item is available for purchase.

When the item creator user has indicated an item is available for purchase and, optionally the item is approved by the item creating application for local sale, the method 300 can proceed to the operation 308, which can include causing a requesting application to indicate that the item is available. For example, a server device, which is in communication with the item creating application and the item requesting application, can receive data provided to the item creating application by the item creating user and make the data available via the item requesting application. In this way, various different item requesting users can access various menus of item creating users to benefit from any items and/or services offered by the item creating users. The method 300 can proceed from the operation 308 to an operation 310, which can include determining whether a request for the item has been received via the item requesting application.

When an item is determined to have been requested via the item requesting application, the method 300 can proceed to an operation 312 of causing instances of an item transferring application to indicate that an item requesting user has requested the item from the item creating user. Otherwise, when a request is determined to not have been received at the operation 310, the method 300 can return to the operation 302. The operation 312 can be performed by the server computing device that is in communication with the item requesting application and multiple instances of the item transferring application. For example, an indication rendered at an instance of the item transferring application can include a GUI element with natural language content characterizing: a location of the requested item, a location of the requesting user (with prior permission from the requesting user), an estimated travel time for transferring the item from a first geographic location (e.g., location of requested item) to a second geographic location (e.g., location of requested user), and/or a cost of completing the task of transferring the item. In some implementations, the server device can cause certain item transferring users to receive this indication when the item transferring users are within a threshold distance from the item creating user, the item, the requesting user, and/or any other suitable location. Alternatively, or additionally, the server device can cause certain item transferring users to receive this indication when an estimated amount of time of completing the task of transferring the item is within a threshold amount of time.

For example, the method 300 can proceed from the operation 312 to an operation 314 of determining whether any values were submitted by any item transferring users within a threshold distance associated with the item creating user and/or the item requesting user. When the determination is made that a value was submitted from one or more item transferring users that are located within the threshold distance, the method 300 can proceed to an operation 316. In some implementations, the operation 314 can include determining whether each value submitted by each transferor user is satisfies a value threshold. The value threshold can be set by the item creating user, the item requesting user, and/or the server device that is in communication with one or more of the applications. In some implementations, the value threshold can be generated in response to the item requesting user requesting the item, and the value threshold can be based on a location of the item, a location of the item requesting user, a token value (e.g., a currency value) of the item as established by the item creating user, a processing value established by a provider of the item creating application, and/or any other data that a threshold can be based on. For example, the value threshold can be generated based on a cost of traveling from the item creating user to the item requesting user at a time when the item is ordered and/or at a time when the item is expected to be ready for transfer. Alternatively, or additionally, the value threshold can be based on an amount of traffic that may be experienced by the item transferring user when traveling from the item creating user to the item requesting user. In some implementations, a particular value threshold can be generated for a particular transferor user, therefore there may be multiple different value thresholds generated for a particular item to be transferred. Each value threshold can be based on a value that a respective item transferor user is expected to be driving (e.g., as indicated by an item transferor user via their item transferor application), an amount of traffic that the respective item transferor user is expected to experience, an amount of items that the respective transferor user has delivered within a period of time (e.g., within the last t hours and/or minutes, where t is any number value), and/or any other data that a value threshold can be based.

When no item transferring user within the threshold distance submits a value for the transfer task, the method 300 can proceed, via continuation element "A," to an operation 322, as illustrated in FIG. 3B. In some implementations, the server device can cause certain instances of the item transferring application to solicit a first type of item transferring users to submit information regarding their willingness to participate in transferring the item. When none of the first type of item transferring users submit a value, the server computing device can solicit a second type of item transferring users to submit values regardless of whether the second type of item transferring users are located within the threshold distance.

A particular item transferring user can submit a value via an interface of their item transferring application, and the server device can cause this value to be rendered at an instance of the requesting application used by the item requesting user. The server device can cause multiple different values from multiple different item transferring users to be rendered at the requesting application so that the item requesting user can select a value corresponding to a particular user. The method 300 can proceed from the operation 308 to an operation 312. The operation 312 can include causing the item requesting application to identify the one or more values submitted by one or more respective item transferring users. For example, the item requesting application can cause one or more selectable elements to be rendered at a GUI of the item requesting application, and the item requesting user can select a particular selectable GUI element that they believe is suitable for the particular transfer task. The method 300 can proceed from the operation 316 to an operation 318 of determining that the item requesting user has selected a particular value submitted by an item transferring user. The method 300 can then proceed from the operation 318, via continuation element "A," to the operation 322.

The operation 322 can include causing a particular instance of the item transferring application to identify a task of transferring the item from the item creating user to the item requesting user. For example, the particular instance of the item transferring application can render an indication that an item requesting user has selected a particular value submitted by the particular item transferring user (e.g., a first type of item transferring user). Alternatively, or additionally, the particular instance of the item transferring application can render an indication that the item transferring user (e.g., a second type of item transferring user) has been selected to complete the transferring task because no other item transferring users within the threshold distance submitted a suitable value.

The method 300 and/or the method 320 can proceed from the operation 322 to an operation 324, which can include determining whether the item has been indicated as available for transfer. The item can be initially indicated as not available for transfer when an item creating user adds the item to their personalized application page. However, when the item creating user is ready to create the item for others to request, the item creating user can interact with the item creating application to indicate that the item is available for requesting. Thereafter, an item requesting user can request the item via their item requesting application. When the item creating user has prepared the item such that the item is ready for pickup by the item transferring user, the item creating user can interact with their item creating application to designate the requested item as available for pickup. In response, the item transferring user selected at the operation 316 can receive an indication that the item is available for the item transferring user to pickup and transfer to the item requesting user.

When the item is not indicated as yet being available for transfer, the method 320 can proceed from the operation 324 to an operation 326, which can include causing the item creating application to provide access to an interface for indicating whether the item is available for transfer. For example, the interface can include a selectable GUI element that is rendered with a default value of "not ready," but can transition to a value of "ready" when the item creating user interacts with the selectable GUI element. When the item creating user interacts with the interface to cause the requested item to be indicated as ready for transfer, the operation 324 can result in the method 320 continuing to the operation 328. The operation 328 can include causing the item transferring application to render a selectable element for providing a route between the location of the item and another location for the requesting user. In this way, the item transferring user can be put on notice of an efficient route for traveling from their current location, to a location of the requested item, and finally to a location of the requesting user. In some implementations, the route can also include details for commuting from the location of the requesting user back to the current location of the item transferring user.

Figure 4:
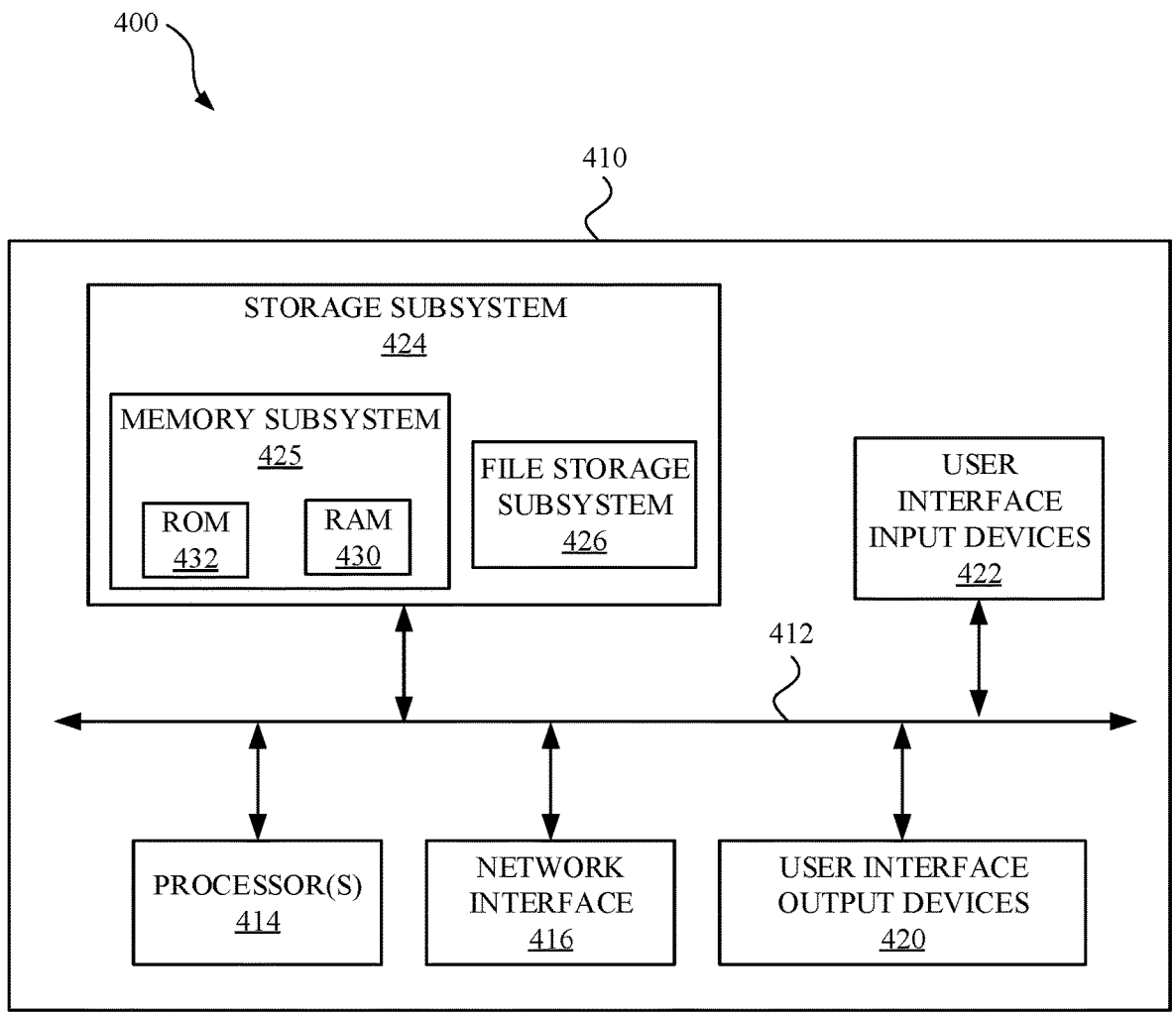
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of the method 300 and the method 320, and/or to implement one or more of system 200, computing device 114, server computing device, computing device 122, computing device 144, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, by a server device and via instances of an item transferring application, multiple inputs that identify multiple different values, submitted by multiple different transferring users, to characterize a task of traversing a distance between a first geographic location and a second geographic, wherein the first geographic location is associated with an item creating user and the second geographic location is associated with an item requesting user. The method can further include causing, by the server device, an interface of a requesting application to provide access to each value of the multiple different values via an interface of the requesting application, wherein the interface is rendered at a first computing device associated with the item requesting user. The method can further include receiving, by the server device and from the first computing device, a separate input indicating that a particular value of the multiple different values has been selected, wherein the particular value was submitted to the server device by a particular transferring user, of the multiple different transferring users, via a second computing device. The method can further include determining, by the server device, whether the item is available for the particular transferring user to transfer the item from the first geographic location to the second geographic location. The method can further include, when the item is determined to be available for the particular transferring user to transfer from the first geographic location to the second geographic location: causing, by the server device, another interface of the item transferring application to render a selectable element that, when selected, causes a route from the first geographic location to the second geographic location to be rendered at the second computing device.

In some implementations, determining whether the item is available for the particular transferring user to transfer the item from the first geographic location to the second geographic location includes: determining, by the server device, whether the item creating user has indicated, via an interaction with an item creating application of a third computing device, that the item is available for transfer by any of the multiple different transferring users. In some implementations, the method can further include, when the item is determined to not be available for the particular transferring user to transfer from the first geographic location to the second geographic location: causing the item transferring application of the second computing device to render a time value that is based on an amount of time specified by the item creating user for the item to be available for transfer or for the item to be created.

In some implementations, the method can further include causing, by the server device, the instances of the item transferring application to indicate that the item requesting user has selected an item GUI element via a separate interface of the requesting application, wherein the multiple inputs that identify multiple different values are submitted in response to the requesting user selecting the item GUI element. In some implementations, causing the instances of the item transferring application to indicate that the item requesting user has selected the item GUI element via the separate interface of the requesting application includes: causing the instances of the item transferring application to allow each transferring user of the multiple different transferring users to submit a value input for characterizing the task of traversing a distance between the first geographic location and the second geographic location.

In some implementations, an arrangement of the separate interface of the requesting application is based on a prior interaction between the item creating user and an item creating application of a third computing device that is separate from the first computing device and the second computing device. In some implementations, the method can further include determining that the multiple different transferring users are located within a threshold distance from the first geographic location, wherein the threshold distance is based on a process time for generating the item. The method can further include determining that each value of the multiple different values satisfies a value threshold, wherein the value threshold is at least partially based on the distance between the first geographic location and the second geographic.

In some implementations, the process time is specified by the item creating user via an item creating application of a third computing device. In some implementations, the method can further include, when the item is determined to be available for the particular transferring user to transfer from the first geographic location to the second geographic location: causing, by the server device, the other interface of the item transferring application to render the selectable element that, when selected, also causes another route from a current location of the particular transferring user to the first geographic location to be rendered at the second computing device. In some implementations, the method can further include, when the item is determined to be available for the particular transferring user to transfer from the first geographic location to the second geographic location: causing, by the server device, the other interface of the item transferring application to render another selectable element that, when selected, causes a camera application to be initialized for capturing an image of the item.

In other implementations, a method implemented by one or more processors is set forth as including operations such as receiving, at a server device, an availability request indicating that an item creating user has added an available item to a creator interface of a creator application of a first computing device, wherein adding the available item to the creator interface associates the available item with a first geographic location. The method can further include causing, by the server device and in response to receiving the availability request, a request interface of a requesting application to indicate that the item creating user has added the available item to the creator interface of the item creating application. The method can further include receiving, at the server device and via the requesting application, an item request indicating that a requesting user has selected, via the requesting application, a graphical user interface (GUI) element corresponding to the available item, wherein the requesting user accesses the requesting application via a second computing device that is located at a second geographic location that is separate from the first geographic location. The method can further include causing, by the server device and in response to receiving the item request, multiple instances of an item transferring application to solicit, from multiple different item transferring users, inputs that indicate a value for a task of traversing, with the available item, a distance between the first geographic location and the second geographic location. The method can further include receiving, at the server device and via a third computing device, a particular input that characterizes a particular value for an item transferring user, of the multiple item transferring users, to traverse the distance between the first geographic location and the second geographic location. The method can further include causing, by the server device and in response to receiving the particular input, the requesting application to render the particular value at a display interface of the second computing device, wherein the particular value is rendered with a selectable GUI element that, when selected by the requesting user, causes the third computing device to indicate that the particular value was selected by the requesting user.

In some implementations, causing the multiple instances of the item transferring application to solicit the inputs that indicate the value for the task of traversing the distance between the first geographic location and the second geographic location includes: identifying the multiple different item transferring users, from various different item transferring users, as being located within a threshold distance from the first geographic location and/or the second geographic location. In some implementations, the threshold distance is based on an amount of time specified by the item creating user to generate the item after the item has been requested by the item requesting user. In some implementations, causing the multiple instances of the item transferring application to solicit the inputs that indicate the value for the task of traversing the distance between the first geographic location and the second geographic location includes: causing each instance of the multiple instances of the item transferring application to provide access to transfer details data that indicate: a distance between the first geographic location and the second geographic location, and an amount of time that each item transferring user of the multiple item transferring users is able to submit a value input.

In some implementations, the method can further include determining that the requesting user selected the selectable GUI element corresponding to the particular value. The method can further include causing, by the server device and in response to the selectable GUI element being selected, the requesting application to render an order identifier field at the display interface of the second computing device, wherein an order identifier is provided to the item transferring user via the item transferring application in response to the requesting user submitting the order identifier via the order identifier field.

In yet other implementations, a method implemented by one or more processors is set forth as including operations such as determining, at a server device, that a requesting user has made a selection of a selectable element being rendered at an interface of a requesting application of a first computing device, wherein the selectable element corresponds to an item that is to be produced by an item creating user and transferred by an item transferring user of one or more item transferring users. The method can further include causing, in response to the selection of the selectable element, a first notification to be provided to the item creating user via an item creating application of a second computing device for indicating that the requesting user has selected the selectable element, wherein the interface of the requesting application is arranged according to one or more prior interactions between the item creating user and the item creating application. The method can further include determining, in response to the selection of the selectable element, whether one or more item transferring users are available for transferring the item, wherein the one or more item transferring users are determined to be available based on location data that is accessible via one or more other computing devices associated with the one or more item transferring users. The method can further include, when an item transferring user of the one or more item transferring users is determined to be available for transferring the item: causing a second notification to be provided, via an item transferring application of a third computing device, to the item transferring user for indicating that the item has been requested by the requesting user. The method can further include causing a third notification to be provided, via the requesting application, to the requesting user when the item transferring user has received the item at a location associated with the item creating user.

In some implementations, the one or more item transferring users correspond to a first type of item transferring user that is different than a second type of item transferring user, and the method further comprises: when the one or more item transferring users are determined to not be available for transferring the item: determining that a particular item transferring user, corresponding to the second type of item transferring user, is available for transferring the item from the item creating user to the requesting user, and causing a separate instance of the item transferring application to indicate to the particular item transferring user that the item has been requested by the requesting user. In some implementations, the second type of item transferring user includes any item transferring users that have selected, via a settings interface of the item transferring application, a preference setting of the item transferring application that has not been selected by the first type of item transferring user.

In some implementations, determining whether the one or more item transferring users are available for transferring the item includes: determining whether the one or more item transferring users are capable of arriving at the location associated with the item creating user within a threshold amount of time of the item creating user completing production of the item. In some implementations, the method can further include causing, in response to the selection of the selectable element, an order identifier interface to be rendered at the requesting application for submitting an order identifier, wherein the requesting application causes the item transferring application of the third computing device to receive the order identifier in response to the requesting user submitting the order identifier via the order identifier interface.

We claim:

1. A method implemented by one or more processors, the method comprising:
   receiving, by a plurality of second computing devices and via instances of an item transferring application, multiple audio inputs that identify multiple different token values, directly submitted by multiple different transferring users, to characterize a task of traversing a distance between a first geographic location and a second geographic,
      wherein the first geographic location is associated with an item creating user and the second geographic location is associated with an item requesting user, and wherein the item requesting user is different than an item transferring user;
   transmitting, by the plurality of second computing devices, audio input data to a server device, wherein the audio input data characterizes the multiple audio inputs;
   causing, by the server device, the audio input data to be converted and parsed into textual data that characterizes each value of the multiple different token values;
   causing, by the server device, an interface of the requesting application to provide direct access to each value of the multiple different token values of the textual data via a graphical user interface (GUI) of the requesting application,
      wherein the GUI is rendered at a first computing device associated with the item requesting user;
   receiving, by the server device and from the first computing device, a separate input indicating that a particular token value of the multiple different token values has been directly selected, by the item requesting user, via the GUI rendered at the first computing device,
      wherein the particular token value was submitted to the server device by the particular transferring user, of the multiple different transferring users, via a second computing device, and the particular transferring user specifies the particular token value via an audio input to the item transferring application at the second computing device, and
      wherein the particular token value is a respective custom token price that can be earned by the item requesting user via the item transferring application;
   determining, by the server device, that the item is available for the particular transferring user to transfer the item from the first geographic location to the second geographic location;
   causing, by the server device, another interface of the item transferring application to render a selectable element that, when selected, causes a route from the first geographic location to the second geographic location to be rendered at the second computing device,
      wherein causing the other interface of the item transferring application to render the selectable element is performed in response to determining that the item is available for the particular transferring user to transfer from the first geographic location to the second geographic location; and
   causing, in response to the particular transferring user completing the task of traversing the distance between the first geographic location and the second geographic, the particular token value to be transferred to the item transferring application,
      wherein the particular transferring user utilizes the particular token value to pay for items available via a respective instance of the item transferring application.

2. The method of claim 1, wherein determining that the item is available for the particular transferring user to transfer the item from the first geographic location to the second geographic location includes:
   determining, by the server device, that the item creating user has indicated, via an interaction with an item creating application of a third computing device, that the item is available for transfer by any of the multiple different transferring users.

3. The method of claim 1, further comprising:
   subsequent to causing the other interface of the item transferring application to render the selectable element:
      determining that the item is not available for the particular transferring user to transfer from the first geographic location to the second geographic location; and
      causing the item transferring application of the second computing device to render a time value that is based on an amount of time specified by the item creating user for the item to be available for transfer or for the item to be created,
         wherein causing the item transferring application to render the time value is performed in response to determining that the item is not available for the particular transferring user to transfer from the first geographic location to the second geographic location.

4. The method of claim 1, further comprising:
causing, by the server device, the instances of the item transferring application to indicate that the item requesting user has selected an item GUI element via a separate interface of the requesting application,
wherein the multiple inputs that identify multiple different token values are submitted in response to the requesting user selecting the item GUI element.

5. The method of claim 4, wherein causing the instances of the item transferring application to indicate that the item requesting user has selected the item GUI element via the separate interface of the requesting application includes:
causing the instances of the item transferring application to allow each transferring user of the multiple different transferring users to submit a respective token value to be earned by each transferring user for completing the task of traversing the distance between the first geographic location and the second geographic location,
wherein the multiple different token values include each respective token value from each transferring user.

6. The method of claim 4, wherein an arrangement of the separate interface of the requesting application is based on a prior interaction between the item creating user and an item creating application of a third computing device that is separate from the first computing device and the second computing device.

7. The method of claim 4, further comprising:
determining that the multiple different transferring users are located within a dynamic threshold distance from the first geographic location,
wherein the threshold distance is based on a process time for generating, by the item creating user, the item; and
determining that each value of the multiple different token values satisfies a value threshold,
wherein the value threshold is at least partially based on the distance between the first geographic location and the second geographic.

8. The method of claim 1, further comprising:
causing, by the server device, the other interface of the item transferring application to render the selectable element that, when selected, also causes another route from a current location of the particular transferring user to the first geographic location to be rendered at the second computing device,
wherein causing the other interface to render the selectable element is performed in response to determining that the item is available for the particular transferring user to transfer from the first geographic location to the second geographic location.

9. The method of claim 1, further comprising:
causing, by the server device, the other interface of the item transferring application to render another selectable element that, when selected, causes a camera application to be initialized for capturing an image of the item,
wherein causing the other interface to render the other selectable element is performed in response to determining that the item is available for the particular transferring user to transfer from the first geographic location to the second geographic location.

* * * * *